Sept. 23, 1952

A. J. HORNFECK 2,611,812

ELECTRICAL CONTROL SYSTEM

Filed Dec. 1, 1945

INVENTOR.
ANTHONY J. HORNFECK
BY
Raymond W. Junkins
ATTORNEY

Sept. 23, 1952  A. J. HORNFECK  2,611,812
ELECTRICAL CONTROL SYSTEM
Filed Dec. 1, 1945  2 SHEETS—SHEET 2

INVENTOR.
ANTHONY J. HORNFECK
BY Raymond W. Jenkins
ATTORNEY

Patented Sept. 23, 1952

2,611,812

UNITED STATES PATENT OFFICE 2,611,812

ELECTRICAL CONTROL SYSTEM

Anthony J. Hornfeck, Cleveland Heights, Ohio, assignor to Bailey Meter Company, a corporation of Delaware Application December 1, 1945, Serial No. 632,215

10 Claims. (Cl. 177—351)

This invention relates to electrical measuring and control systems, and particularly to balanceable electric networks for calculating the interrelation or functional values of variables. Such variables may be quantities, qualities, conditions, positions, or the like.

For example such a variable may be the rate of flow of a fluid to be measured.

In the measurement or determination of a variable it is frequently desirable to give a result in terms of a function of the variable, or conversely it is frequently desirable to use a function of the variable in ascertaining the value of the variable. For example, in measuring or determining the volume rate of flow or weight rate of flow of a fluid through a conduit, it is more expeditious to employ the pressure differential produced by the fluid passing through a restriction in a conduit as an indication inferentially of the actual volume rate or weight rate of the fluid. A quadratic relation exists between such differential pressure and the actual rate of flow. The result, as for instance a visual indication or continuous record, is desirably to be in units of volume rate or weight rate per unit of time and frequently an integration with respect to time. Through the agency of my invention it is readily possible to have means sensitive to such a differential pressure and produce, at a local or remote location, a continuous visual indication in terms of weight rate or volume rate. In other words, to continuously extract the square root.

My calculating system is adapted to the production of a function of a variable or to the use of a function of the variable in producing a measurement of the variable. For example, a functional relation between the variable and some indication of the variable may be a square root relation or a five halves power or the like.

A further object of my invention is to provide a telemetering calculator wherein the network comprises what I term a transmitter and what I term a receiver which may be located adjacent the one to the other, or remotely from each other. Inasmuch as the invention is incorporated in a balanceable electric network it is feasible to locate the transmitter and the receiver a considerable distance apart if desired.

Further objects will be understood and appreciated from a study of the drawings and the description to follow.

Figure 1:
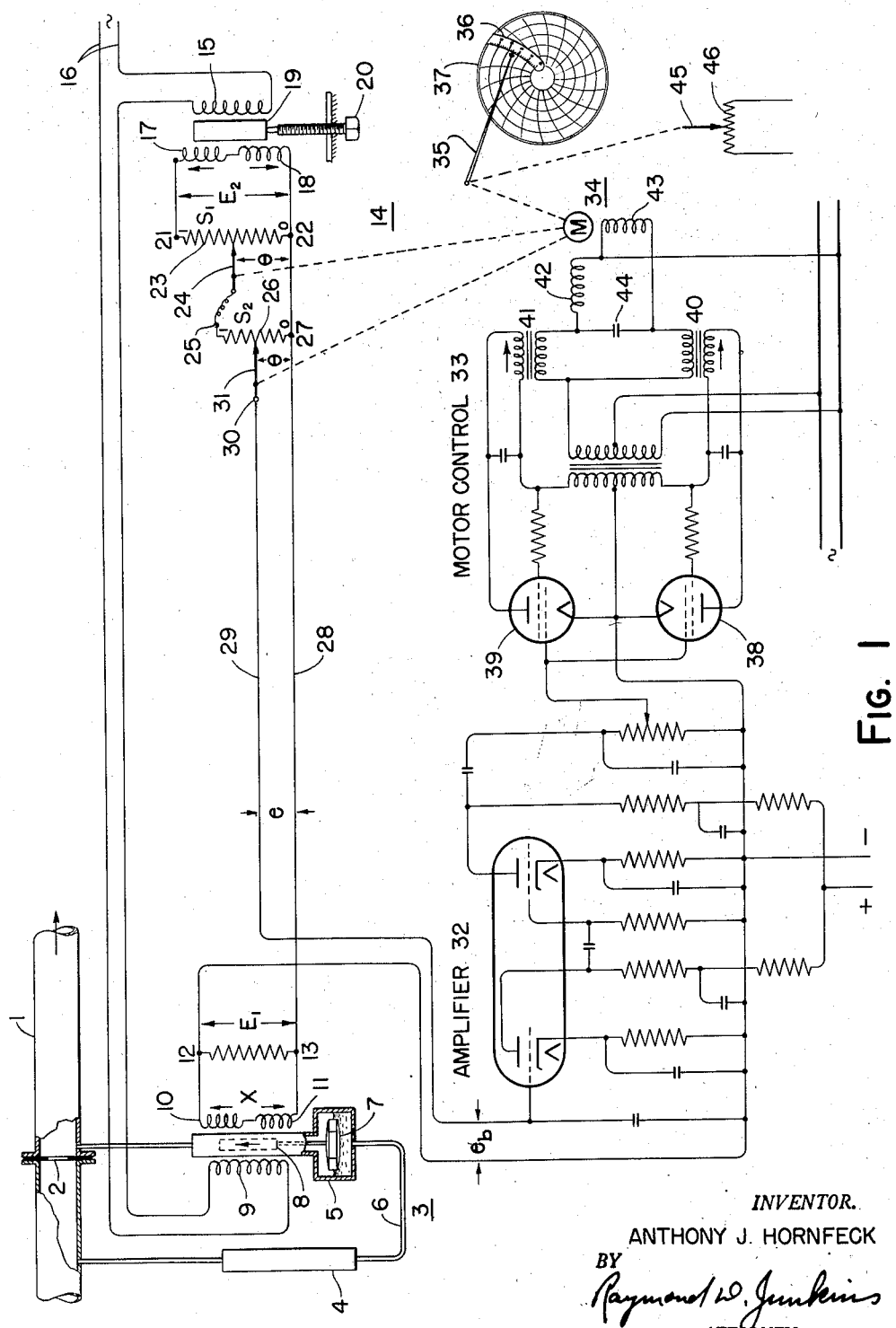
Fig. 1 is a diagrammatic embodiment of my invention in connection with a fluid rate of flow meter.

In Fig. 1, I show diagrammatically a balanceable electrical network primarily useful, by way of example, in extracting the square root of a variable such as fluid rate of flow through a conduit 1.

It is common in the metering art to insert a restriction, such as an orifice plate 2, in the path of the fluid flow and thus obtain a "head" or differential pressure bearing a functional relation to rate of fluid flow through the restriction. The relation between volume flow rate and differential pressure (head) is:

$$Q = cM\sqrt{2gh} \qquad (1)$$

where $Q$ = cu. ft. per sec.
$c$ = coefficient of discharge.
$M$ = meter constant (depends on pipe diameter and diameter of orifice hole).
$g$ = acceleration of gravity = 32.17 ft. per sec. per sec.
$h$ = differential head in ft. of the flowing fluid.

The coefficient of discharge remains substantially constant for any one ratio of orifice diameter to pipe diameter, regardless of the density or specific volume of the fluid being measured. With $c$, $M$ and $\sqrt{2g}$ all remaining constant, then $Q$ varies as the $\sqrt{h}$.

If it is desired to measure the flowing fluid in units of weight, Equation 1 becomes:

$$W = cM\sqrt{2ghd} \qquad (2)$$

where $W$ = rate of flow in pounds per sec.
$d$ = density in pounds per cu. ft. of the flowing fluid.
$h$ = differential head in inches of a standard fluid such as water.
$M$ = meter constant now including a correction between the density $d$ of the flowing fluid being measured and the density of the liquid in the manometer which is some standard such as water.

In each case, whether the measurement is in volume rate or in weight rate, it will be observed that the rate varies as the $\sqrt{h}$, i. e. as the square root of the differential pressure measured across the orifice or other restriction 2.

Numerous complicated metering arrangements have been proposed and used for extracting the square root relationship between head and rate. The simplest possible form of U-tube manometer with a float on the mercury in one leg will provide a measurement of the differential pressure. The complication occurs in the mechanism necessary to translate such float motion into terms of rate of flow.

In a large percentage of applications it is desired to provide one or more remote indications (or recordings) of the flow measurement. Various telemetric schemes have been proposed and used, both hydraulic, pneumatic or electrical.

My invention, as illustrated by one embodiment, in Fig. 1, provides a simple and accurate solution of the combination of the two problems above stated, namely, a remote visual indication of the measurement of a fluid flow in terms of rate. I electrically extract the square root in the electrical network used in telemetering the float position to a point of visual indication.

Referring now specifically to Fig. 1, I show a flow meter 3 comprising a U-tube having legs 4 and 5 joined by a tube 6. A sealing liquid, such as mercury, partially fills the U-tube. On the surface of the mercury in leg 5 is a float 7 adapted to position a magnetic member such as a core piece 8 within a portion of the leg 5 of non-magnetic material.

The basic telemetering circuit involved is disclosed in my copending application Serial No. 569,479, now Patent 2,439,891, dated April 20, 1948, wherein the meter 3, which I will term the transmitter, comprises a movable core transformer having a primary alternating current energized winding 9 and a pair of bucking secondary windings 10, 11. The bucking secondary windings 10, 11 are inductively energized from the primary winding 9 through the agency of the core 8. When the core is in a central or neutral position relative the windings 9, 10 and 11 a voltage $E_1=0$ exists across the terminals 12, 13. When the core is moved from neutral position toward one end of the coil assembly a voltage $E_1$ is developed as a function of core position. The relation is linear over the operating range. I designate the motion of the core 8 from its neutral position as 1 or 100% for a movement corresponding to maximum range of the apparatus. The proportionate movement for any mathematical consideration of the system is designated as $x$. Thus for $x$ movement of the core 8 there will be a certain change in the voltage $l_1$ across the terminals 12, 13.

At 14 I indicate what I term the receiver including the necessary elements for maintaining the network in balance and for providing a visual indication, and/or record, of the flow rate. The receiver may be located adjacent to or remote from the transmitter.

It will be appreciated that while I am describing my invention as applied to the measurement of a fluid rate of flow, this is by way of example only and the invention may be in similar manner applied to the measurement of other variables involving a functional relationship in their determination or interpretation.

At the receiver I show an alternating current energized primary winding 15 similar to the primary winding 9 and connected in series therewith across an alternating current source of power 16. I also provide, at the receiver, a pair of bucking secondary windings 17, 18 similar to the transmitter windings 10, 11. Coupling the windings 15, 17 and 18 is a core piece 19 manually positionable by the knob 20 for initial zero and range calibration or adjustment.

Across the terminals 21, 22 of the secondary windings there will exist a voltage $E_2$. The core 8 starts from a position central or neutral relative the windings 9, 10 and 11 and moves its total travel in one direction therefrom. At maximum value $x$, corresponding to maximum rate of fluid flow, voltage $E_1=E_2$.

Across the terminals 21, 22 I provide a slide wire resistance 23 adjustably contacted by an arm 24 whose function of travel is indicated by $\theta$.

The contact arm 24 is connected to a terminal 25 of a slide wire resistance 26. The other terminal 27 of the resistance 26 joins the conductor 28 which connects the terminals 13, 22. Adjustably contacting the resistance 26 is an arm 31 joined to a terminal 30 of a conductor 29. The function of motion of the contact 31 along the resistance 26 I designate as $\theta$. The voltage between the terminals 27, 30 or across the conductors 28, 29 I designate as $e$. The voltage across the terminals 12, 30 I designate as $e_b$.

The circuit including the windings 10, 11, 17, 18, the resistances 23, 26 and the conductors 28, 29 comprise a balanceable network of the null type. When the circuit is in balance $e_b=0$. When the circuit is unbalanced through movement of the core 8 then the direction and extent of such unbalance is evidenced by an alternating current of plus phase or of minus phase between the terminals 12 and 30 and a voltage $e_b$ representative of the extent of unbalance.

Inserted in the conductor 29 between the terminals 12 and 30 I include an amplifier 32 and motor control 33 for controlling the direction and speed of rotation of a motor 34 whose function is to position the contact arms 24, 31 and to simultaneously position an indicator arm 35 relative a scale 36 and a time revoluble chart 37. The circuit 32, 33 is disclosed in the Ryder Patents 2,275,317 and 2,333,393, as well as in my Patent 2,439,891. It is, therefore, not believed to be necessary to go into any considerable detail in that regard in the present application. Suffice it to say that the amplifier 32 is phase sensitive to the voltage $e_b$ for selective control of the electron discharge devices 38, 39, which in turn selectively control the saturable core reactors 40, 41, as well as the magnitude of their output. The motor 34 is of the capacitor-run type having two windings 42, 43 ninety electrical degrees apart and a capacitor 44. When current flow is through one of the windings directly across the alternating current source and through the other winding in series with the capacitor across the alternating current source the motor rotates in predetermined direction. The direction of rotation and speed thereof is determined by whether the saturable core reactor 40 or reactor 41 predominates and the extent of predominance.

In operation, assuming a balanced electrical condition of the network, a change in position of the core 8 will unbalance the network. The direction of such unbalance and the magnitude thereof will be evidenced by a plus phase or a minus phase across the terminals 12, 30 and by the magnitude of the voltage $e_b$. The phase sensitive amplifier 32 will cause the motor control circuit 33 to cause the motor 34 to rotate in predetermined direction and speed to position contact arms 24 and 31 simultaneously along the resistances 23 and 26 respectively until the network is in balance, at which time $e_b=0$ and motor rotation ceases. The rotation of the motor 34 is linear with respect to $\theta$ and thus the positioning of the arm 35 is linear with respect to the scale 36 and the chart 37. The motion of the motor 34 is not, however, linear with respect to the motion $x$ of the core 8 or inferentially to the change in differential pressure.

Thus a change in differential pressure across the orifice 2 (resulting from a change in rate of flow) extracts the functional relation between the two and produces an indication and record upon 36, 37 in linear relation to rate of flow.

Inasmuch as the angle of rotation of the motor 34 is linear with rate of flow and the motion of the contact arms 24, 31 relative to the slide wires 23, 26 is similarly linear, and the motion of the indicator arm 35 relative to the scale 36 and chart 37 is linear, then the motor may also position a contact 45 relative to a resistance 46 for control purposes or other purposes requiring a linear motion with relation to rate of fluid through the conduit 1.

The balancing of the network and the extraction of the square root function may be explained as follows:

At balance
$$e_b=0$$
and hence
$$E_1=e$$
Let
$$\theta = \frac{\text{Actual rotation of slidewires } S_1 \text{ and } S_2}{\text{Max. possible rotation of slidewires } S_1 \text{ and } S_2}$$
$$= \frac{\text{actual flow}}{\text{max. flow}}$$
$$X = \frac{\text{Actual displacement of core 8}}{\text{Max. possible displacement of core 8}}$$
$$= \frac{\text{actual head}}{\text{max. head}}$$

$E_0 =$ Max. voltage available across secondaries of transmitting solenoid and receiving solenoid (when $X=1$)

$E_2 = E_0 X$ $E_2 = E_0$ (by positioning of 19 with 20)

$E_2\theta =$ voltage between 25 and 22

$e =$ (voltage between 25 and 22) $\theta$

Then
$$e = E_2\theta \cdot \theta = E_2\theta^2$$

NOTE.—For this relation to hold accurately it is necessary that the resistance of slide wire $S_2$ be much higher than $S_1$. If $S_2 > 10 S_1$ the relation is quite accurate.

Hence
$$E_0 x = E_0 \theta^2$$
and
$$\theta^2 = x$$
$$\theta = \sqrt{x}$$

So that for any movement $x$ (due to change in differential pressure) the resultant motion $\theta$ of elements 24, 31, 35 and 45 is equal to $\sqrt{x}$.

Figure 2:
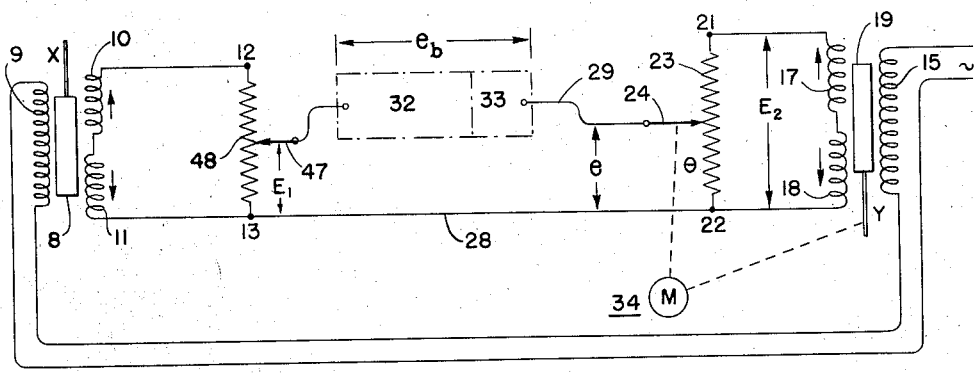
Fig. 2 is an electric circuit showing a modification of Fig. 1.

In Fig. 1 I illustrate and describe a circuit arrangement for extracting the square root of a variable through the simultaneous movement of two contacts, each separately movable over a linear slide wire. In Fig. 2 I illustrate an embodiment of my invention somewhat similar in nature to Fig. 1, but wherein the square root function is extracted through the simultaneous positioning of one slide wire contact member and the transformer core member at the receiver station.

In the circuit of Fig. 2 I have shown schematically the amplifier 32 and motor control circuit 33 responsive to the phase and magnitude of the voltage $e_b$ for controlling directional and speed rotation of the motor 34, which latter positions a contact 24 over the slide wire resistance 23 and simultaneously positions the core 19 relative to the windings 15, 17 and 18.

Positioning of the core 19 varies the basic relationship between $E_2$ and $E_1$.

At balance:
$$E_1 = e$$
At each instant
$$E_1 = E_0 x$$
and
$$e = E_2$$
also
$$E_2 = E_0 y$$
making
$$e = E_0 y \theta$$
now
$$y = \theta$$
on a percent basis making
$$e = E_0 \theta^2$$
substituting values of $E_1$ and $e$ in the first equation, then
$$E_0 x = E_0 \theta^2$$
and
$$x = \theta^2$$
or
$$\theta = \sqrt{x}$$

The result is that positioning of the motor 34, the arm 24 and the core 19 are in linear relation to the square root of the motion of core 8.

Figure 3:
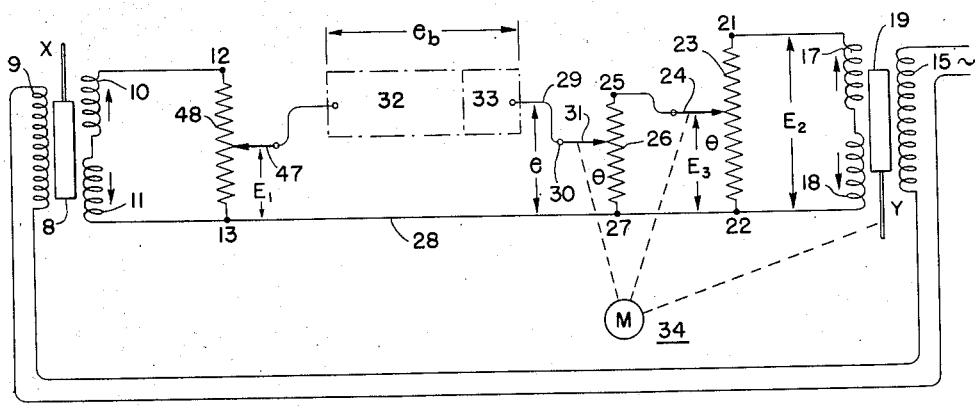
Fig. 3 is a further modification combining certain of the features of Fig. 1 and Fig. 2.

In Fig. 3 I show an arrangement whereby I can extract any integral root; but not a fractional root such as the five halves power relation between head and rate of liquid flow over a V-notch weir for example. Referring to Fig. 3, the circuit is in some respects a combination of Figs. 1 and 2 in that I show the motor 34 simultaneously positioning the slide wire contacts 24 and 31 as well as the receiver core 19. It will, of course, be appreciated that in both Figs. 2 and 3 I have not felt it necessary to show the motor 34 positioning an indicator arm 35 or a remote control arm 45, which would merely duplicate that part of the showing of Fig. 1.

The functioning of the circuit of Fig. 3 is as follows:

If
$$E_1 = E_0 x$$
and
$$E_2 = E_0 y$$
where $E_0 =$ voltage developed when solenoid cores are at 100% position, at balance
$$E_1 = e$$
$$E_0 x = E_0 y \theta^2$$
Since
$$Y = \theta$$
on a percent basis
$$E_0 x = E_0 \theta^3$$
and
$$\theta = (x)^{1/3}$$

From this it will be seen that within practical constructional limits the number of slide wire resistors, such as 23 and 26, which may be cascaded in the circuit determines the root that may be extracted.

In Figs. 2 and 3 manual adjustment and range may be accomplished by moving the contact 47 over the resistance 48.

Figure 4:
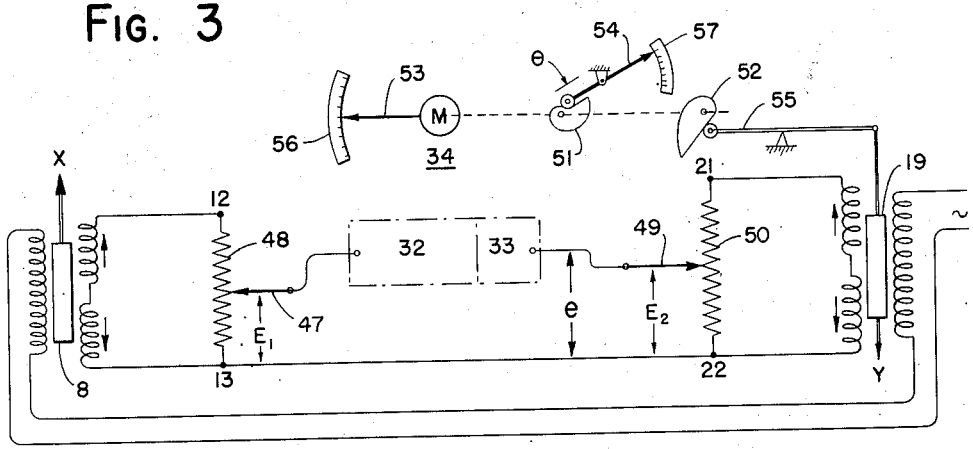
Fig. 4 is an embodiment of my invention for extracting substantially any functional relation whether integral or odd.

In Fig. 4 I show the possibility of range and adjustment through manually positioning the contact arms 47 and 49 relative to the resistances 48 and 50.

The motor 34 is under the control of units 32 and 33 as previously described. Positioned by the motor 34 is a linear rise cam 51 and a functional rise cam 52. The motor rotation and the cam 51 being linear, then the indicator pointers 53 and 54 are linear values, while the positioning of the rocker arm 55, and consequently of the receiver core 19, through the agency of the cam 52, is in accordance with the square root or five halves power or other functional relation between the variable which positions the core 8 and the desired indication on the scale 56 or the scale 57.

By way of example the core 8 may be positioned (as in Fig. 1) by differential pressure, and it be desired that the indication 53, 56 and the indication 54, 57 be the square root of differential pressure or directly in terms of fluid rate of flow through the orifice 2. In that event the cam 52 is shaped as the square rather than as the square root, and this gives a particular advantage in that it gives a very slow rise at zero whereas the square root cam would have an infinite rise at zero.

Further by way of example, if we have a liquid flowing over a V-notch weir the relationship between head of liquid at the weir and rate of flow over the weir is a five halves power relationship. In that event if the core 8 is positioned in accordance with head then it would be desired that the indicator 53, 56 or the indicator 54, 57 be readable directly in terms of weight rate of liquid over the weir or in accordance with the five halves power of the head at the weir. In that event the cam 52 would be shaped to extract the five halves power. The operation is as follows:

I designate on Fig. 4 that the angular rotation of the motor 34 and of the cams 51 and 52 is linear and therefore the angular rotation of the cam 52 and the rise of the roller on 54 are linear and equal to $\theta$.

$$x = (Q)^a$$
$$y = (\theta)^a$$
$$E_1 = E_0 x = E_0 (Q)^a$$
$$E_2 = E_0 y = E_0 (\theta)^a$$

Since $E_2 = E_1$ at balance so that $e_b = 0$ $$(\theta)^a = (Q)^a$$
$$\theta = Q$$

From the above it will be seen that the rotation of the motor 34 is linear and $\theta = Q$ the quantity or rate of flow because the motion of $x$ is equal to the quantity raised to the $(a)$ power or $(Q)^a$, while the motion Y of the core 19 (through the agency of the cam 52) is equal to $(\theta)^a$.

It will thus be seen that I have disclosed embodiments of my invention directed to extracting functional relationships of different kind and degree between a variable and a function of the variable which it is desired to indicate either adjacent or remote relative to the measuring element. Further advantages will be apparent to those skilled in the art and it is to be understood that what I have illustrated and described is only by way of example and not limiting.

What I claim as new, and desire to secure by Letters Patent of the United States, is:

1. In a calculating network, in combination, a transmitter including means to continuously convert exponential function of a variable to an equivalent electric potential; a receiver having means to provide an opposing potential at least as large as the maximum value of the first potential; potential adjusting means between the receiver potential and the transmitter potential including; a series of individual potential adjusting devices arranged with the first device of the series selecting a portion of the energization potential of the receiver and each subsequent device of the series selecting a portion of the potential of its preceding device; an indicator movable over a linear scale; means responsive to unbalance between the transmitter and receiver potentials for actuating a balancing and indicator operating motor; mechanical connections between the motor and several individual potential adjusting devices to adjust them linearly; and a mechanical connection between the motor and indicator to move the same linearly over said scale.

2. The calculating network defined in claim 1 in which the means providing the opposing potential at the receiver comprises a primary winding energized from a source of A.-C.; said first potential adjusting device of the series comprises two opposed connected secondaries and a movable core coupling them to the primary; and the subsequent device of the series includes a resistance connected across said secondaries and a slider movable over said resistance.

3. The calculating network defined in claim 1, in which at least one of the potential adjusting devices is of the potentiometer type.

4. The apparatus as claimed in claim 1 in which the means responsive to unbalance actuates each potential adjusting device to effect the same percentage adjustment.

5. Apparatus for performing electrical evolution including in combination a connected transmitter and receiver, the former adapted to deliver a potential corresponding in value to an exponential function of a variable, the latter including an indicator pointer movable over a linear scale graduated in terms of the variable, said receiver having a source of opposing potential equal to the maximum potential available from the transmitter, potential adjusting means between said receiver potential and that of the transmitter, motor means responsive to unbalance between the transmitter and adjusted receiver potentials to actuate said pointer and said potential adjusting means to balance said potentials, said potential adjusting means comprising a resistor across the receiver potential, a slider movable over said resistor to select a portion of it, a resistor across said portion, and a slider to select a portion of the potential on the second resistor, said motor means driving said sliders to select equal percentages of the resistor potentials.

6. A telemetering and calculating system including in combination, a transmitter having an excited primary winding and two secondaries connected in opposition, a core movable to unbalance said secondaries in response to a movement equivalent to an integral power of a variable whereby a potential corresponding to said power is delivered, a receiver electrically connected to the transmitter and including a primary excited in common with that of the transmitter, two secondaries connected in opposition and a core adjustable for calibration, a shunt connected across said receiver secondaries, a slider movable over said shunt, a second shunt across the portion of the first shunt between the slider and one end thereof, a second slider to select a portion of the voltage on the second shunt, there being a shunt and slider for each unit of power of the variable at the transmitter, conductors connecting the output of the last shunt and slider in opposition to the secondary output of the transmitter, means responsive to unbalance voltage in said conductors to actuate said sliders to provide balance, the arrangement being such that all sliders are moved in the same ratio, and a pointer directly moved by said last mentioned means to cooperate with a linear scale to indicate the actual value of said variable.

7. A telemetering and calculating system including in combination, a transmitter having an excited primary winding and two opposed connected secondaries, a core movable to unbalance said secondaries in response to a movement equivalent to an integral power of a variable whereby a potential corresponding to said power is delivered, a receiver electrically connected to the transmitter and including a primary excited in common with that of the transmitter, two opposed connected secondaries and a core, a shunt connected across said receiver secondaries, a slider movable over said shunt, a second shunt across the portion of the first shunt between the slider and one end thereof, a second slider to select a portion of the voltage on the second shunt, there being a shunt and slider for each unit of power of the variable at the transmitter above one, conductors connecting the output of the last shunt and slider in opposition to the potential delivered by the transmitter, motor means responsive to unbalance voltage in said conductors to actuate said sliders and receiver core to provide balance, the arrangement being such that all sliders and core are moved to produce the same ratio of reduction in voltage controlled thereby, and a pointer directly moved by said motor means to cooperate with a linear scale to indicate the actual value of said variable.

8. A telemetering and calculating system including in combination, a transmitter having an excited primary winding and two like, spaced secondaries connected in series opposition, a core movable only from a position neutral to said secondaries to one side of neutral to unbalance them and produce a potential which is a linear function of the percentage of core movement from neutral, means to move said core in accordance with an integral power of a variable whereby the produced potential corresponds to the value of said power; a receiver including a primary excited in common with that of the transmitter, two like spaced secondaries connected in series opposition, a movable core, a shunt connected across said secondaries, a slider movable over said shunt to select portions of its potential equivalent to the linear displacement of the slider on the shunt, a corresponding shunt and slider cascaded to the first for each integer above one in the said power, conductors connecting the output of the last shunt and slider in opposition to the secondary output of the transmitter, means responsive to unbalance voltage in said conductors to actuate said sliders each to the same percentage of its shunt to provide balance, and means movable in linear relation to one of said sliders to designate the value of said variable on a uniform scale.

9. A system as defined in claim 8 in which the receiver also actuates a control means in linear relation to the value of said variable.

10. A system as defined in claim 8 in which the transmitter core is positioned by the float of a U-tube orifice type flow meter where float and core position represent the square of the rate of fluid flow through the meter and in which two cascaded shunts at the receiver extract the square root of the variable and indicate the value of flow directly on a linear scale.

ANTHONY J. HORNFECK.

REFERENCES CITED

The following references are of record in the file of this patent:

UNITED STATES PATENTS

| Number | Name | Date |
|---|---|---|
| 1,626,560 | Schneider | Apr. 26, 1927 |
| 1,986,986 | Swartwout | Jan. 8, 1935 |
| 2,050,629 | Quereau | Aug. 11, 1936 |
| 2,285,540 | Stein | June 9, 1942 |
| 2,330,427 | Hornfeck | Sept. 28, 1943 |
| 2,336,492 | MacKay | Dec. 14, 1943 |
| 2,363,690 | Razek | Nov. 28, 1944 |
| 2,406,221 | Hornfeck | Aug. 20, 1946 |